(12) United States Patent
Frank et al.

(10) Patent No.: US 9,909,310 B2
(45) Date of Patent: Mar. 6, 2018

(54) MINERAL FIBER BASED CEILING TILE

(71) Applicant: USG Interiors, LLC, Chicago, IL (US)

(72) Inventors: William A. Frank, Lake Villa, IL (US); Matthew T. Langdon, Cloquet, MN (US); Wenqi Luan, Kildeer, IL (US); Martin W. Brown, Gurnee, IL (US)

(73) Assignee: USG INTERIORS, LLC, Chicago, IL (US)

(*) Notice: Subject to any disclaimer, the term of this patent is extended or adjusted under 35 U.S.C. 154(b) by 0 days.

(21) Appl. No.: 15/139,357

(22) Filed: Apr. 27, 2016

(65) Prior Publication Data

US 2017/0204604 A1 Jul. 20, 2017

Related U.S. Application Data

(63) Continuation-in-part of application No. 14/995,213, filed on Jan. 14, 2016.

(51) Int. Cl.
| | |
|---|---|
| *E04B 1/84* | (2006.01) |
| *E04B 1/82* | (2006.01) |
| *E04B 9/00* | (2006.01) |
| *E04B 1/99* | (2006.01) |
| *E04B 1/86* | (2006.01) |

(52) U.S. Cl.
CPC ............ *E04B 9/001* (2013.01); *E04B 1/8209* (2013.01); *E04B 1/8409* (2013.01); *E04B 1/86* (2013.01); *E04B 1/99* (2013.01)

(58) Field of Classification Search
CPC ........ E04B 1/8209; E04B 1/8409; E04B 1/86; E04B 1/99; E04B 9/001

USPC ............................ 181/286, 294; 52/144, 145
See application file for complete search history.

(56) References Cited

U.S. PATENT DOCUMENTS

| | | | | |
|---|---|---|---|---|
| 3,255,843 | A | * | 6/1966 | MacDonald ............ B32B 27/00 156/257 |
| 3,357,516 | A | * | 12/1967 | Cadotte ..................... E04B 1/86 181/290 |
| 3,573,145 | A | | 3/1971 | Witkosky et al. |
| 3,822,764 | A | * | 7/1974 | Val ............................ E04B 1/86 181/286 |
| 4,540,605 | A | | 9/1985 | Barone |
| 6,299,727 | B1 | | 10/2001 | Hatanaka et al. |
| 6,443,258 | B1 | * | 9/2002 | Putt ......................... B28C 5/381 181/286 |

(Continued)

OTHER PUBLICATIONS

Notification of Transmittal of the International Search Report and the Written Opinion of the International Searching Authority, or the Declaration dated Oct. 6, 2016 for PCT/US2016/029653, filed Apr. 28, 2016.

*Primary Examiner* — Edgardo San Martin
(74) *Attorney, Agent, or Firm* — Pearne & Gordon LLP

(57) ABSTRACT

An acoustical tile having a wet laid mineral fiber basemat, a non-woven porous fiberglass veil adhered to the basemat and covered with a light reflecting air permeable coating, at least 90% of the weight of the basemat comprising mineral wool and binder, a weight of the binder being less than 1/11 of the weight of the mineral fiber, the basemat having a density of between about 11.4 and about 14.2 lbs/cubic foot, the mineral fiber having an average diameter of between 4.5 and 8.3 microns, the composite of the basemat, veil and coating exhibiting good NRC and CAC performance values.

15 Claims, 1 Drawing Sheet

(56) References Cited

U.S. PATENT DOCUMENTS

| | | | |
|---|---|---|---|
| 6,613,424 B1 * | 9/2003 | Putt | B28C 5/381 |
| | | | 106/122 |
| 8,062,565 B2 * | 11/2011 | Mueller | E04B 9/001 |
| | | | 162/152 |
| 9,376,810 B2 * | 6/2016 | Kemp | B32B 5/26 |
| 2002/0096278 A1 * | 7/2002 | Foster | B44C 5/04 |
| | | | 162/141 |
| 2003/0060113 A1 * | 3/2003 | Christie | D04H 1/52 |
| | | | 442/364 |
| 2003/0134556 A1 * | 7/2003 | Christie | D04H 1/52 |
| | | | 442/327 |
| 2005/0211500 A1 | 9/2005 | Wendt et al. | |
| 2008/0121461 A1 | 5/2008 | Gross et al. | |
| 2009/0126886 A1 | 5/2009 | Englert et al. | |
| 2010/0320029 A1 * | 12/2010 | Cao | E04B 9/001 |
| | | | 181/286 |
| 2011/0251043 A1 | 10/2011 | Brown | |
| 2012/0024625 A1 * | 2/2012 | Cao | E04B 9/001 |
| | | | 181/290 |
| 2012/0155688 A1 | 6/2012 | Wilson | |
| 2013/0133978 A1 | 5/2013 | Borroni | |
| 2013/0291990 A1 * | 11/2013 | Nagarajan | F16L 59/029 |
| | | | 138/140 |
| 2015/0308111 A1 | 10/2015 | Kemp et al. | |

\* cited by examiner

MINERAL FIBER BASED CEILING TILE

This application is a continuation-in-part of application Ser. No. 14/995,213, filed Jan. 14, 2016.

BACKGROUND OF THE INVENTION

The invention relates to mineral fiber based acoustical ceiling tile.

PRIOR ART

The terms mineral fiber and mineral wool are used interchangeably herein. Acoustical tiles, widely used in suspended ceilings, are rated for their sound absorbing and sound transmitting properties. In the industry, sound absorption is measured by noise reduction coefficient, NRC, which should be above 0.55 to qualify as having acceptable acoustical properties. High performance tiles typically have an NRC rating in the order of 0.85 or more. Sound transmission is measured as ceiling attenuation class, CAC, and acceptable values are at least 23.

A common type of ceiling tile has a basemat or core made primarily of mineral wool in a well-known water felted or wet laid process. The mineral wool, binder and lesser amounts of other solids are mixed in a dilute water slurry and deposited on a moving foraminous screen. During the mixing process, the mineral wool fibers tend to ball up and form nodules which largely retain their character when deposited on the mat forming screen. Water is gravity and vacuum separated from the solids on the screen and subsequently the solids are heat and air dried to form a rigid basemat.

It has been the practice to sand one side of the dried water felted basemat to facilitate adhesive attachment of a non-woven fiberglass scrim or veil. The veil is typically painted or coated to improve its light reflectance.

Conventional mineral wool-based wet laid basemats range in density between about 14 to about 16.5 lbs/cubic foot. The lower side of this density range has been limited, at least in part, to a difficulty in establishing a mat that has a sufficiently low density and wet strength to maintain its integrity while moving through the production process, particularly when the basemat is for moderately low caliper product. Mineral fiber typically used in this application has had an average fiber diameter of 3.5 to 4.1 microns.

SUMMARY OF THE INVENTION

The invention involves a mineral fiber ceiling tile that achieves relatively high acoustical properties both in noise absorption and noise transmission. The inventive construction is characterized by a low density wet laid basemat made of relatively large average diameter mineral wool fiber as compared to mineral fiber diameters traditionally used in this application. The relatively large fiber diameter has been found to produce an increase in the loft or free volume of the basemat as it is being deposited and formed on the wire screen of the water felting or wet laid process. The increased loft permits development of a basemat with a relatively low density and air flow resistance. The result is a high noise reduction coefficient (NRC) potential even with a low caliper, i.e. a relatively thin finished tile.

Ceiling tile made with the disclosed basemat and without a backcoat exhibits a useful measure of ceiling attenuation class (CAC). Moreover, the disclosed ceiling tile construction can be readily and inexpensively adjusted for increased CAC performance with only a limited loss of NRC by application of a clay-based backcoat.

DESCRIPTION OF THE PREFERRED EMBODIMENT

Figure 1:
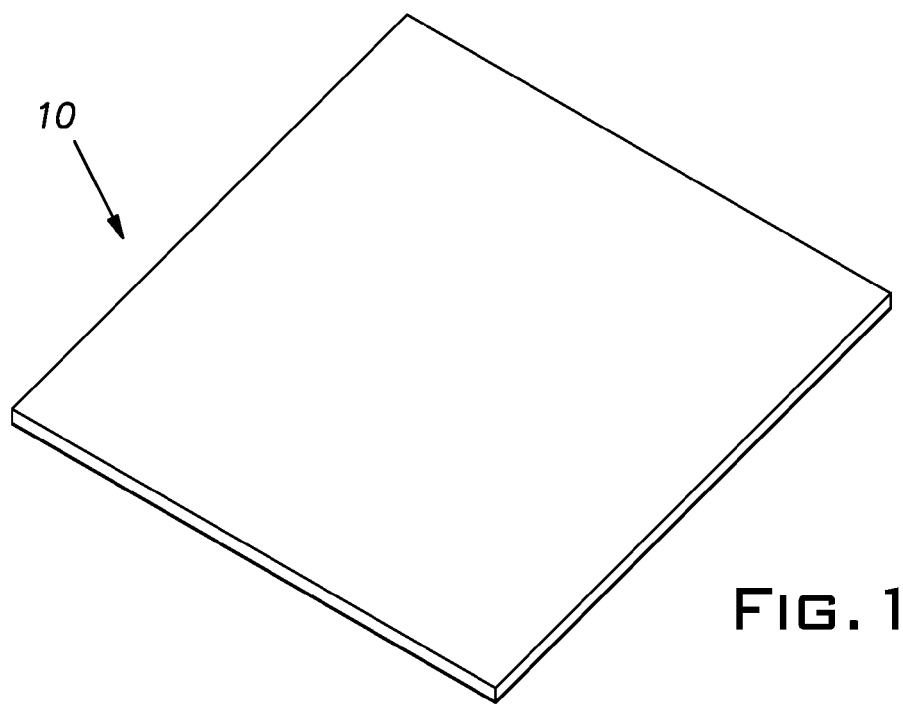
FIG. 1 is a perspective view of an acoustical ceiling tile embodying the invention.
Figure 2:
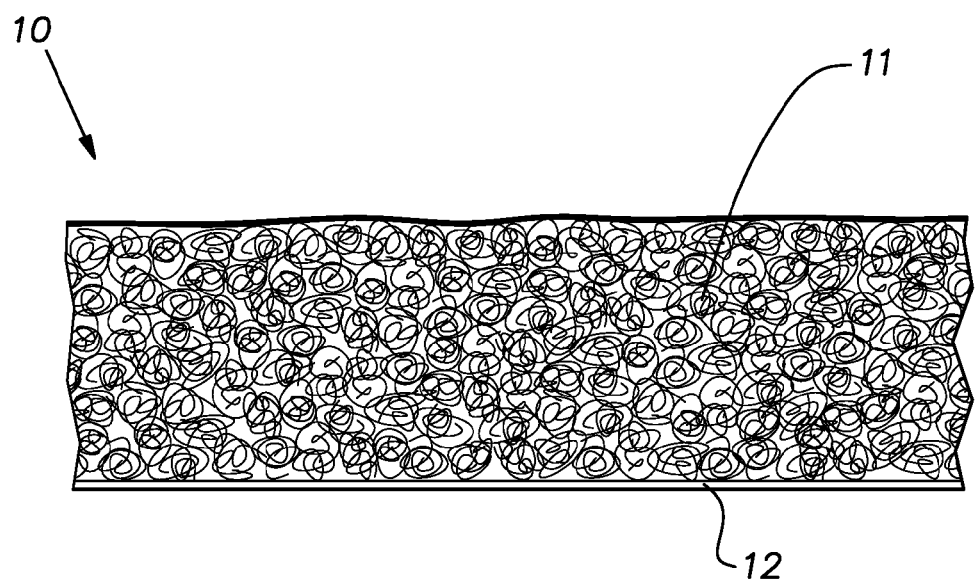
FIG. 2 is a fragmentary cross-sectional view of the ceiling tile.

FIG. 1 illustrates a high performance acoustical ceiling tile 10 constructed in accordance with the invention. The illustrated tile is square, nominally measuring 2 foot by 2 foot on its major faces. Other conventional face sizes such as 2 foot by 4 foot are contemplated. Those skilled in the art will understand that dimensions referenced herein may be changed to those equivalent under industry metric standards.

The tile 10 comprises a basemat or core 11 covered by a non-woven veil or scrim 12 on a side of the basemat towards a room when the tile is installed. The veil 12 may be painted on the room side and the back side of the basemat may be provided with an optional backcoating.

The basemat 11 is formed from a water based dilute slurry primarily composed of mineral fiber and binder. By way of example, the basemat solid constituents (on a weight percent basis) can be approximately:

85-95%, preferably about 91.8%, mineral wool, including ordinary shot content;
  0-3%, preferably about 1.5%, gypsum;
  5-10%, preferably 6.7% binder(s), for example 3.8% latex, 2.9% starch.

Minor amounts of other materials such as a biocide or a fire retardant may be included. In total, the solids may represent 4.2 to 4.5% of the weight of the slurry with the remaining weight comprising water.

It will be understood from the foregoing, that the basemat is primarily mineral fiber and that the mineral fiber and binder combined preferably exceed 90% of the solids and the binder is preferably between about $1/11$ and $1/15$ the weight of the mineral wool.

The mat is formed in a conventional wet laid or water felted process well known in the industry. The basemat constituents are thoroughly mixed in a dilute water slurry which is then deposited on a moving foraminous screen in a layer of controlled height. Water is drained from the solids through the screen by gravity and vacuum. The still wet basemat is slightly pressed on the screen with another overlying screen and/or rollers to a desired thickness and subsequently dried in an oven. The binder serves to fix the mineral fibers together in a rigid porous mass.

One side of the basemat is ground flat, as is conventional, to facilitate adhesive bonding of the non-woven fiberglass veil to the basemat. An example of a suitable veil is the product CH52 manufactured Owens Corning Veil Netherlands B.V. and described as follows:

Area weight—125 g/m$^2$
  Air porosity—1900 l/m$^2$/s at 100 Pa

A suitable adhesive is used to adhere the veil to the basemat without significantly altering the air flow properties of the veil or the basemat. The adhesive may be a commercially available water based product such as Aquence™ PL114A marketed by Henkle™ applied at a rate of 3.6 to 3.9 grams/ft$^2$. An outer surface of the veil is typically covered with a porous or non-blocking light reflecting coating or paint to achieve a desired light reflectance (LR) of, for example, 0.87 using a solids coating (primarily $TiO_2$) of, for example, 11.2 grams/ft$^2$, or for a LR of 90, a solids coating of about 15 grams/ft$^2$. The primary function of the veil is aesthetic so as to provide a relatively uniform flat surface for the light reflective coating. The LR coating and veil do not significantly affect the acoustical properties of the basemat. Additionally, the veil serves to resist sagging of the tile when the tile is installed in a ceiling grid and supported at its perimeter.

In accordance with one aspect of the invention, a low caliper acoustical ceiling tile construction, such as nominal ½ inch and ⅝ inch caliper tiles, are produced from a wet felted mineral fiber-based basemat with a density of preferably about 10.0 to about 14.5 lbs/cubic foot and more preferably from about 11.4 to about 14.2 lbs/cubic foot.

To obtain these relatively low densities in a low caliper product, it has been found desirable to modify conventional mineral wool formulations and, seemingly counter-intuitively, to increase the fiber diameter from that conventionally used. As stated above, a typical conventional mineral wool average diameter typically has been between 3.5 and 4.1 microns. The present invention contemplates an average mineral wool fiber diameter of 4.5 to 8.3 microns with a target of 6 microns and in as produced random lengths.

A typical prior art mineral wool formulation by weight percent is 94% slag and 6% granite rock. New slag/natural rock mineral wool formulations based on weight percent used in the present invention include "a high granite" wool at 83% slag, 17% granite rock and a basalt wool at 80% slag, 20% basalt rock. Potential other formulations include a basalt wool of 60% slag, 40% basalt rock. The foregoing weight percent ratios may be varied by, for example, increasing or decreasing the granite or basalt by 10% and decreasing or increasing the slag by the same percent. A mineral fiber composition including basalt has greater elasticity or resilience than a granite/slag composition and is presently preferred.

The term "slag" as used herein is iron blast furnace slag having major chemical constituents typically as reported by the National Slag Association (U.S.A.), namely:

| Major Chemical Constituents in Iron Blast Furnace Slag | |
|---|---|
| Constituent | Weight Percent |
| Lime (CaO) | 32 to 45 |
| Magnesia (MgO) | 5 to 15 |
| Silica ($SiO_2$) | 32 to 42 |
| Alumina ($Al_2O_3$) | 7 to 16 |

More recently, iron blast furnace slag is characterized as a combination of minerals:

Melilite (akermanite and gehlenite) [$Ca_2MgSi_2O_7$—$Ca_2Al_2SiO_7$]
Merwinite, Calcium-Magnesium-Silicate [$Ca_3MgSi_2O_8$]
Calcium-Silicate [$CaSiO_3$]
Monticellite [$CaMgSiO_4$]

A rough approximation of the proportions is:

Melilite ~70%, the remaining phases (Merwinite, Calcium-Silicate, and Monticellite) making up the other 30%.

When combined these constituents usually exist as an isomorphic mixture with the following general formula:

$$Ca_2(MgFeAl)(SiAl)_2O_7.$$

It has been discovered that mineral fiber of an average diameter of 4.5 to 8.3 microns using the basemat formula set out above develops a greater loft of the slurry solids when being deposited on the travelling wire of the basemat production process. This high loft results in a lower final density of the basemat.

A wet formed mineral fiber based basemat density of about 11.4 to 14.2 lbs/cubic foot in a low caliper acoustical ceiling tile of 11/16 inch or less nominal thickness affords both excellent NRC values and useful CAC values. The performance of the tile can be modified with application of a backcoat (typically clay solids and water) to improve CAC value with only a small loss of NRC performance. These relationships in a tile with the described veil and LR paint are set out in the Product Description Table below at columns E, F and G where the mineral fiber is 80% slag and 20% basalt.

| Product Description Table | | | | | | | |
|---|---|---|---|---|---|---|---|
| Product | A | B | C | D | E | F | G |
| Nominal Thickness (inches) | 1" | ⅞" | ⅞" | ¾" | ⅝" | ⅝" | ½" |
| Actual Caliper (inches) | 1.08 | 0.90 | 0.91 | 0.73 | 0.65 | 0.64 | 0.54 |
| Basemat Density (lbs/ft$^3$) | 12.5 | 13.0 | 13.5 | 15.2 | 11.4 | 11.4 | 11.4 |
| Finished Product Density (lbs/ft$^3$) | 14.2 | 14.7 | 15.2 | 16.9 | 12.2 | 13.0 | 14.1 |
| NRC (Noise Reduction Coefficient) | 0.90 | 0.85 | 0.80 | 0.70 | 0.85 | 0.75 | 0.60 |
| Four Frequency Average (4FA) | 0.8816 | 0.8321 | 0.7794 | 0.6885 | 0.8647 | 0.8428 | 0.8298 |
| CAC (Ceiling Attentuation Class) | 30 | 35 | 35 | 35 | 24 | 24 | 23 |
| Actual CAC | 36 | 39 | 38 | 37 | 24 | 25 | 25 |
| Wool Type | Slag/Basalt | Slag/Basalt | Slag/Granite | Slag/Granite | Slag/Basalt | Slag/Basalt | Slag/Basalt |
| Light Reflectance (LR) | 0.90 | 0.90 | 0.90 | 0.90 | 0.87 | 0.87 | 0.87 |
| Face Coat (dry grams/ft$^2$) | 15 | 15 | 15 | 15 | 11.2 | 11.2 | 11.2 |
| Back Coat (dry grams/ft$^2$) | 18.3 | 27.0 | 21.2 | 21.2 | 0 | 8.64 | 0 |

An average diameter of the mineral fiber in the order of 6 microns, i.e. between 4.5 and 8.3 microns serves to provide a solution in the search for a low caliper high performance acoustical tile with a mineral fiber basemat for two reasons. First, as stated above, the larger than normal fiber diameter has been found to increase the loft of the fiber mat as it is being formed on the travelling wire of the wet felting process. Secondly, the larger diameter affords an increased tensile strength of the individual mineral fibers which serves to hold the basemat structurally together as it is processed along the production line where it is transferred between conveyor rollers and/or belts and is sanded and edge trimmed.

It has been found that a high loft in the basemat is facilitated by use of an appropriate chemical mist coating (sometimes referred to as a de-dusting liquid) to settle the mineral fibers out of the air stream as they are being manufactured in a conventional spinning process. A polyethylene glycol (PEG) water solution (13.5% PEG, 86.5 water) sprayed as a mist on the mineral fiber at a rate of, for example, 0.5% to 1.0% of the weight of the mineral fiber serves to improve lofting performance of the mineral fibers in the wet felting process. Instead of a water and PEG de-dusting mist, a suitable mineral oil can be used for the de-dusting function. The oil should be low in VOC emissions and have high flash and fire points where a high temperature dryer is used to dry the basemat. An example of such an oil has the following characteristics: ISO grade 100, AGMA No. 3, SAE Gear Oil No. 80, SAE No. 30, Viscosity cSc @ 40° C./100° C.-95/11, Viscosity index 101, Flash Point 500° F./260° C. Fire Point 555° F./291° C. A rate of 0.5 to 1.0% by weight of mineral oil to the weight of mineral fiber can be used. It is believed that a residual of the de-dusting liquid exists in the final basemat products described herein.

The disclosed basemat in a low caliper tile construction surprisingly exhibits unique and desirable acoustical properties of both NRC and CAC. This performance is not normally available, for example, in a fiberglass based basemat of the same caliper compared to the inventive basemat.

In accordance with another aspect of the invention, the above disclosed slag/basalt mineral fiber and basemat formulation can be used to produce high performance acoustical panels with both high NRC (Noise Reduction Coefficient) and CAC (Ceiling Attenuation Class) values. This can be accomplished by increasing the thickness or caliper of the basemat and by back coating the basemat with a material that is acoustically reflective. The adhesively attached, painted veil, as described, can be maintained.

Columns A and B of the Product Description Table indicate the characteristics of the described slag/basalt basemat composition (80% slag, 20% basalt) in larger caliper sizes. Conventional prior art slag/granite products are characterized in columns C and D. A comparison of NRC values in columns A and B with values in columns C and D shows a significant increase of NRC in the slag/basalt formulations of the invention over prior art formulations. The product in column B is intentionally produced with a relatively higher basemat density than the other slag/basalt products (columns A, E, F and G) to adjust for a desired higher CAC.

The acoustically reflective back coat levels registered in the Product Description Table can be applied in two successive coats. The back coat(s) prior to drying comprises kaolin clay and water with a minor amount of latex, about 5% by weight, in a second coat. The product of column F is covered with a single back coat coating for appearance. The face coat is an acoustical non-blocking paint that is primarily titanium dioxide and can be applied in two coats.

The slag/basalt mineral fiber basemat formulation described herein exhibits improved loft in the wet laying or felting process so that it is possible to lay down an initial target pre-compressed thickness with less fiber and other slurry materials and, therefore, less density. The slag/basalt fiber basemat meeting the minimum target thickness with less material is pressed into a final, pre-grinding, design thickness with the same reduction in material content. The use of slag/basalt wool can yield improvement in production line speeds (mainly due to dryer capacity) due to improved drainage and lower density. With slag/basalt wool, for a given volume of basemat there is less mass to dry and better air flow through the basemat, and thus less dryer load.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A wet laid basemat for an acoustical tile made primarily of mineral fiber and binder of starch and/or latex, the mineral fiber being formed of slag and a natural rock content exceeding 6% by weight, the mineral fiber having a diameter of between 4.5 and 8.3 microns, the basemat having a density of between 11.4 and 14.2 lbs/cubic foot.

2. A wet laid basemat as set forth in claim 1, wherein the natural rock is granite.

3. A wet laid basemat as set forth in claim 2, wherein the granite content in the mineral fiber is about 17% by weight.

4. A wet laid basemat as set forth in claim 1, wherein the natural rock is basalt.

5. A wet laid basemat as set forth in claim 4, wherein the basalt content in the mineral fiber is between about 20% and about 40% by weight.

6. A wet laid basemat as set forth in claim 1, wherein the mineral fiber is a product of a conventional spinning process in which a de-dusting liquid is used and the mineral fiber carries a residual of the de-dusting liquid.

7. A low caliper acoustical tile having a wet laid mineral fiber basemat forming substantially all of the thickness of the tile, a non-woven porous fiberglass veil adhered to one side of the basemat and covered with a light reflecting air permeable coating on a side remote from the basemat, at least 90% of the weight of the basemat comprising mineral wool and binder, a weight of the binder being less than 1/11 of the weight of the mineral fiber, the basemat having a density of between about 11.4 and about 14.2 lbs/cubic foot, the mineral fiber having an average diameter of between 4.5 and 8.3 microns, the thickness of the basemat being less than 11/16 inch, the composite of the basemat, veil and coating exhibiting an NRC of about 0.60 and a CAC of about 23 when the caliper of the composite is nominally ½ inch and an NRC of about 0.75 and a CAC of about 24 when the caliper of the composite is nominally ⅝ inch.

8. A low caliper acoustical tile as set forth in claim 7, wherein said mineral fiber is made of a mixture of iron blast furnace slag and granite, the weight percent of granite exceeding 6%.

9. A low caliper acoustical tile as set forth in claim 7, wherein the mineral fiber is made of a mixture of iron blast furnace slag and basalt.

10. A low caliper acoustical tile as set forth in claim 9, wherein the basalt ranges between about 20% and about 40% of the weight of the mineral fiber.

11. A low caliper acoustical tile as set forth in claim 7, wherein the mineral fiber is mist-coated with an anti-dusting liquid that serves to facilitate production of a low density basemat in a wet laid process.

12. A high performance acoustical tile having a wet laid mineral fiber basemat forming substantially all of the thickness of the tile, a non-woven porous fiberglass veil adhered to one side of the basemat and covered with a light reflecting air permeable coating on a side remote from the basemat, at least 90% of the weight of the basemat comprising mineral wool and binder, a weight of the binder being less than $\frac{1}{11}$ of the weight of the mineral fiber, the basemat having a density of between about 11.4 and about 14.2 lbs/cubit foot, the mineral fiber having an average diameter between 4.5 and 8.3 microns, the thickness of the basemat being greater than $\frac{5}{8}$ inch, a rear face of the basemat being covered with an acoustically reflecting material, the tile exhibiting an NRC of at least 0.85.

13. A high performance acoustical tile as set forth in claim 12, wherein the acoustically reflective material is a clay coating.

14. A high performance acoustical tile as set forth in claim 12, wherein the mineral fiber is a mix of slag and granite, the granite exceeding 6% by weight of the fiber.

15. A high performance acoustical tile as set forth in claim 12, wherein the mineral fiber is a mix of slag and basalt, the basalt being between about 20% and about 40% by weight of the mineral fiber.

* * * * *